United States Patent
Grasselli

(10) Patent No.: US 10,843,362 B2
(45) Date of Patent: Nov. 24, 2020

(54) APPARATUS FOR SCANNING FOOD PRODUCTS

(71) Applicant: GRASSELLI S.P.A., Albinea (IT)

(72) Inventor: Giorgio Grasselli, Albinea (IT)

(73) Assignee: GRASSELLI S.P.A., Albinea (IT)

(*) Notice: Subject to any disclaimer, the term of this patent is extended or adjusted under 35 U.S.C. 154(b) by 0 days.

(21) Appl. No.: 16/026,256

(22) Filed: Jul. 3, 2018

(65) Prior Publication Data

US 2019/0009421 A1 Jan. 10, 2019

(30) Foreign Application Priority Data

Jul. 6, 2017 (IT) .................. 102017000076239

(51) Int. Cl.
*B26D 5/00* (2006.01)
*A22C 17/00* (2006.01)
*B26D 1/143* (2006.01)

(52) U.S. Cl.
CPC .......... *B26D 5/007* (2013.01); *A22C 17/0033* (2013.01); *A22C 17/0073* (2013.01); *A22C 17/0086* (2013.01); *B26D 1/143* (2013.01); *B26D 2210/02* (2013.01)

(58) Field of Classification Search
CPC .............. A22C 17/0033; A22C 17/002; A22C 17/0086; A22C 17/0073; B26D 5/007; B26D 7/0625; B26D 7/30; B26D 2210/02
See application file for complete search history.

(56) References Cited

U.S. PATENT DOCUMENTS

| | | | |
|---|---|---|---|
| 5,184,733 A * | 2/1993 | Arnarson | A22C 25/00 177/1 |
| 6,882,434 B1 * | 4/2005 | Sandberg | A22C 17/0033 250/223 R |
| 7,452,266 B2 | 11/2008 | Bottemiller | |
| 7,500,550 B2 | 3/2009 | Strong et al. | |
| 7,651,388 B2 | 1/2010 | Faires et al. | |
| 7,672,752 B2 | 3/2010 | Blaine et al. | |
| 7,715,935 B2 | 5/2010 | Vogeley, Jr. et al. | |
| 7,747,042 B2 | 6/2010 | Blaine | |

(Continued)

FOREIGN PATENT DOCUMENTS

| | | |
|---|---|---|
| EP | 2807928 A1 | 12/2014 |
| GB | 2421676 A | 7/2006 |
| WO | 0022934 A1 | 4/2000 |

*Primary Examiner* — Jennifer B Swinney
(74) *Attorney, Agent, or Firm* — Pearne & Gordon LLP

(57) ABSTRACT

The apparatus for detecting physical characteristics of food products, such as poultry, meat or fish, includes: a conveyor for transporting the products; a floating belt, located above the conveyor so as to define an analysis zone (Z) therebetween; a first and a second detecting device, located on opposite sides of an advancement path, each adapted to acquire a multiplicity of partial profiles of the products in the analysis zone (Z), a processing unit connected to the first and second detecting devices and including a first shape module configured to determine the conformation of the external surface of a first portion of the product, based on the partial profiles acquired by the first detecting device; and a second shape module (62) configured to determine the conformation of the external surface of a second portion of the product, based on the partial profiles acquired by the second detecting device.

19 Claims, 11 Drawing Sheets

(56) References Cited

U.S. PATENT DOCUMENTS

| | | | |
|---|---|---|---|
| 9,285,213 B2* | 3/2016 | Lindee | A22C 17/0033 |
| 2003/0036344 A1 | 2/2003 | Sigurdsson et al. | |
| 2006/0156878 A1 | 7/2006 | Faires et al. | |
| 2006/0157388 A1 | 7/2006 | Blaine et al. | |
| 2006/0161380 A1 | 7/2006 | Bottemiller | |
| 2006/0162515 A1 | 7/2006 | Vogeley et al. | |
| 2006/0163032 A1 | 7/2006 | Strong et al. | |
| 2006/0171581 A1 | 8/2006 | Blaine | |
| 2008/0281461 A1* | 11/2008 | Blaine | B26D 3/10 |
| | | | 700/171 |
| 2009/0107311 A1* | 4/2009 | Hiti | B26D 1/547 |
| | | | 83/75.5 |
| 2012/0198974 A1* | 8/2012 | Weber | B26D 5/007 |
| | | | 83/13 |
| 2013/0340580 A1* | 12/2013 | Strong | B26D 5/007 |
| | | | 83/13 |
| 2014/0352505 A1 | 12/2014 | Grasselli | |
| 2015/0336285 A1* | 11/2015 | Grasselli | A22C 17/0033 |
| | | | 83/368 |

* cited by examiner

APPARATUS FOR SCANNING FOOD PRODUCTS

The present invention relates to an apparatus intended for use in the food industry for determining physical characteristics of food products such as meat, poultry or fish, whether fresh or cooked, preferably free of bones or cartilage.

In particular, the invention is directed to an apparatus able to determine the conformation of the food products, as well as the relative density and other physical characteristics of which more in the following.

In still greater detail, the invention relates in particular to a detecting apparatus destined to be arranged upstream of an industrial slicer or to be integrated as a detecting station of a slicer.

Industrial slicers are known, used for slicing food products designed, for example, for large scale retail, for school or company canteens, or for catering.

A known type of slicer comprises a cutting station, a lower conveyor belt for carrying the product to the cutting station and an upper belt, arranged above the conveyor belt, which has the function of pressing the product.

The cutting station comprises a plurality of mobile blades, sometimes arranged horizontally and other times vertically, under which the conveyor belt extends, so that the product pushed into contact with the blades is automatically cut into slices.

An analysis station can be included upstream of the cutting station, which analysis station comprises a laser scanner, arranged above the conveyor belt, for example mounted on a sort of upper bridge structure.

The scanner intermittently produces a laser beam, facing downwards, which from above intercepts the product to be cut, while the product is advancing on the belt, so as to acquire the profile of a plurality of sections.

The profiles are then analysed using software to determine the shape of the product to be cut.

In fact, the products that are to be sliced by this type of machine are well known to have a very irregular shape, for example a chicken breast.

Knowing the shape of the product to be cut is necessary in order to seek to obtain slices having a weight that is as constant as possible.

The cutting station is provided with mobile blades, which enables varying the thickness of the slices; taking account of the shape of each entire product, the thickness of the slices can be regulated so that they have a substantially identical weight.

The known system has some limits, explained below.

As mentioned, for the purpose of obtaining an effective cut of the product, it is necessary that the product be pressed during the slicing, which is done by means of the upper belt mentioned in the foregoing.

However, this operation alters the shape of the product which, during the cutting, is no longer the one detected in the analysis station.

In order to seek to obviate this drawback, the product is sometimes cooled prior to being fed to the machine, so as to make it more rigid and therefore less likely to deform during the pressing by the belt.

However, the cooling of the product has a negative influence on the quality thereof, for which reason it is unfavourably appraised by the operators in the sector.

A further limit is constituted by the fact that the product to be cut can have small cavities at the surface thereof in contact with the conveyor belt, which cavities are not detected by the scanner during the analysis step.

In fact, during the initial cleaning of the meat products such as chicken breasts or the like, the removal of the waste, such as cartilage and the like, can leave recesses on the surface of the product which, if not detected by the scanner, lead to a falsified estimate of the volume of the product, with consequent errors during the cutting operations.

The technical task that underpins the present invention is to propose an apparatus and a detection method that obviates the drawbacks of the above-cited prior art.

The technical task is attained by the apparatus realised in accordance with claim 1 and by the method actuated according to claim 13.

Further characteristics and advantages of the present invention will become more apparent from the following indicative, and hence non-limiting, description of a preferred, but not exclusive, embodiment of an apparatus for detecting food products as illustrated in the appended drawings, in which.

Figure 1:
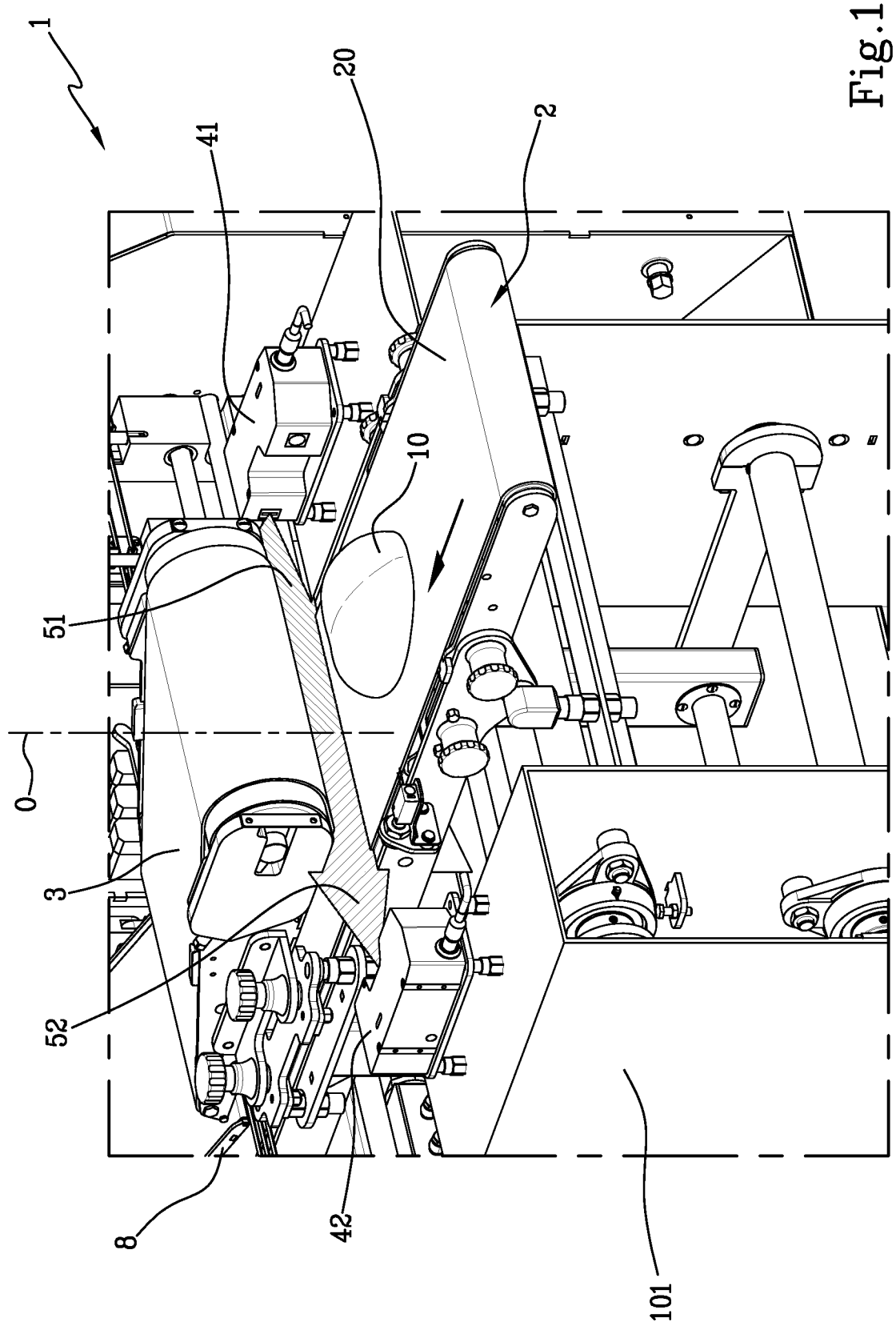
FIGS. 1-3 are axonometric views of the apparatus of the invention, taken at different moments.
Figure 2:
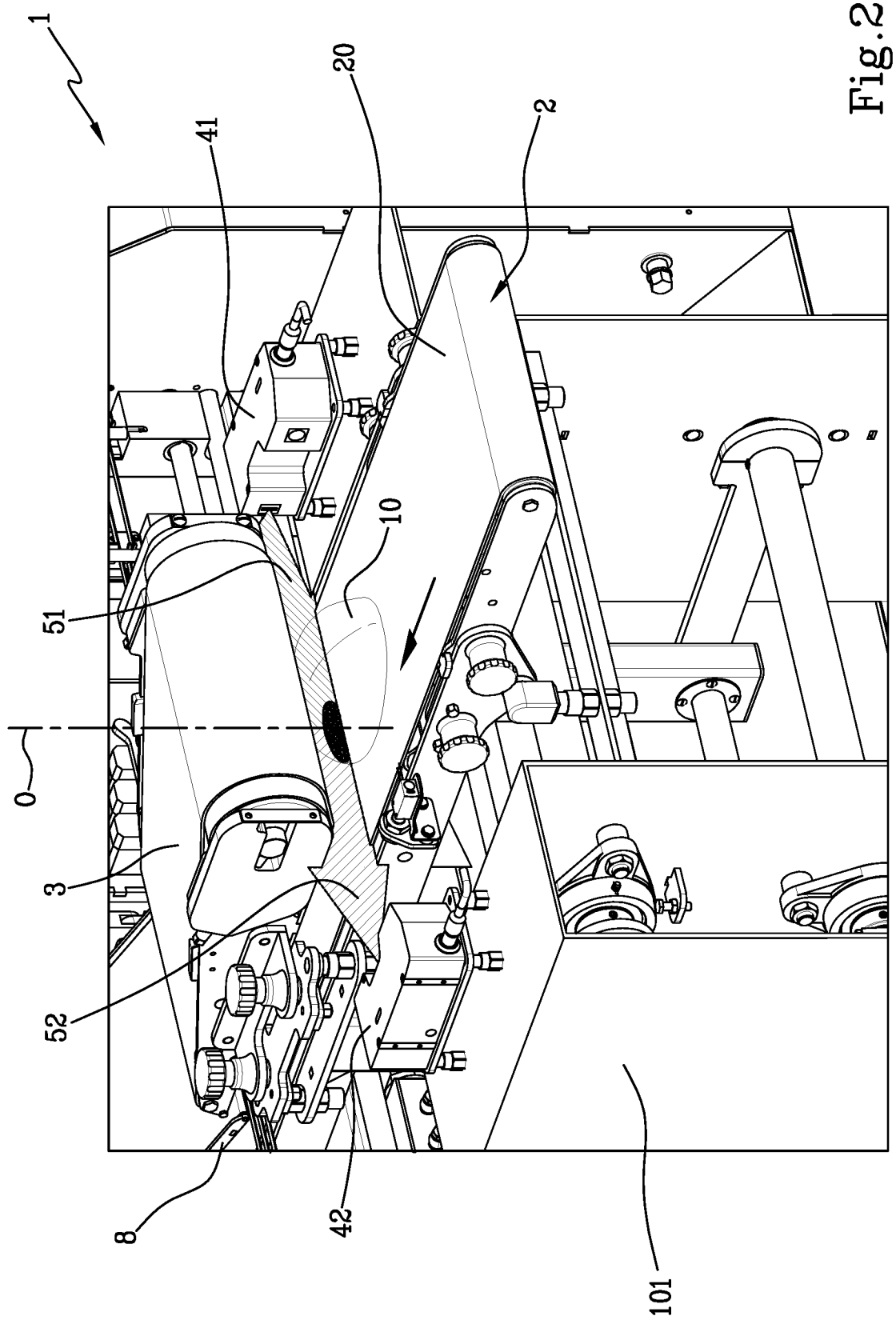

With reference to the above-mentioned figures, reference numeral 1 denotes an apparatus for detecting physical characteristics of food products 10, in particular poultry, meat or fish.

The proposed apparatus 1 is specially intended to be used in a detecting station of an industrial slicer 100, also of the type described in the prior art, or of a novel type, with the aim of obtaining slices having predetermined characteristics.

For example, the slicer 100 can be destined to cutting chicken breast 10 for the following tray-packing thereof.

The apparatus 1 of the invention includes a conveyor 2 for transporting the products 10 to be sliced, one at a time, along an advancement path, preferably straight, at a predetermined advancement speed.

The conveyor 2 can be of the known belt type 20, such as the one illustrated in the appended figures, for example arranged horizontal and activated by an electromechanical actuator.

In a case where the apparatus 1 is associated to a slicer 100, the conveyor 2 can transport the food products 10 directly to a cutting station, where the products 10 detected are subdivided into slices; more description will follow on the structure of the cutting station, after first having illustrated the detecting apparatus 1 in detail.

The invention also includes a device for measuring the weight of the products 10 to be detected which are transported along the advancement path; this device, not illustrated in the appended tables, can for example comprise a load cell or the like.

To be precise, the weight measuring device can be located below the belt 20 of the conveyor 2 or be however connected or integrated to it so as to weigh the products 10 borne resting on the belt 20; alternatively or in addition a weight measuring device can be included, located upstream of the conveyor 2.

The invention also includes the use of an upper floating belt 3, of known type though not in combination with the other components of the invention.

The floating belt 3 is slidable, located above the conveyor belt 2, in substantial superposition and is to be pressed on the products 10 borne by the lower belt, with an adjustable pressure, using components of known type.

Figure 3:
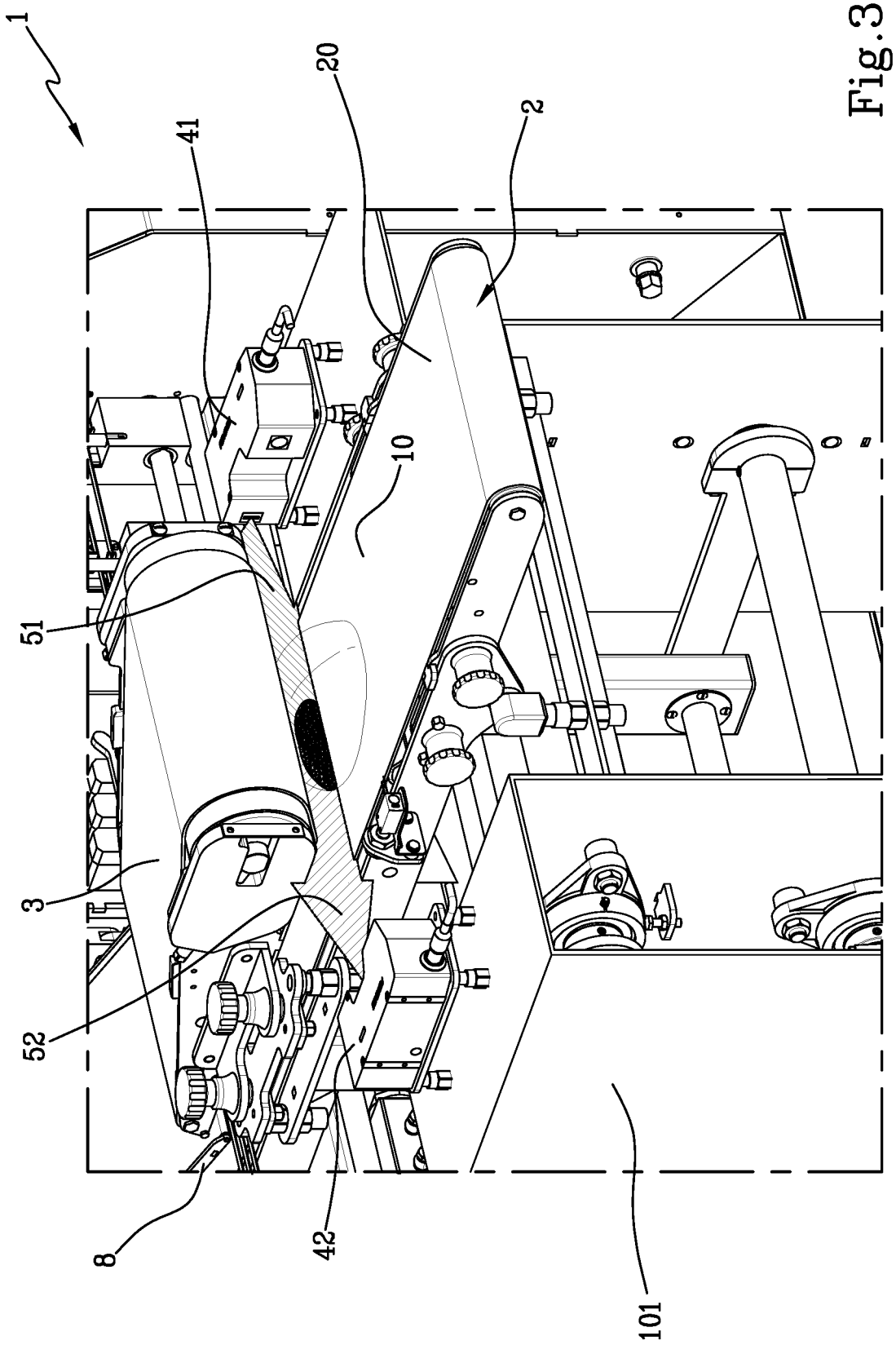
Figure 3A:
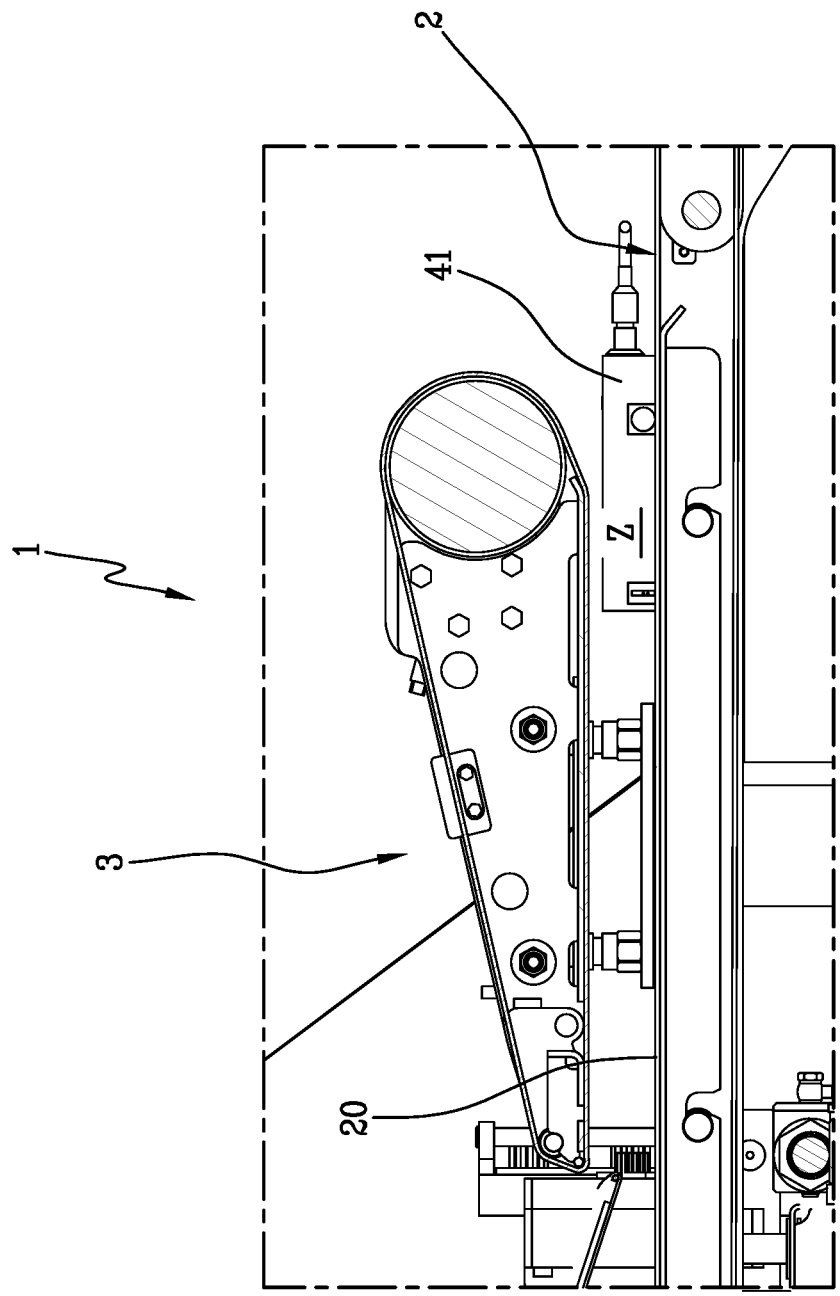
FIG. 3A is a lateral view, in longitudinal section, of a part of the apparatus of the invention, which includes the zone where the analysis of the product is carried out.

The floating belt 3 is shorter than the lower belt 20 and, with it, defines the analysis zone Z of the apparatus 1; in other words, the zone Z in which the floating belt 3 is superposed on the belt 20 of the conveyor 2 is the zone Z in which the analysis of the conveyed products 10 is carried out (see FIG. 3A).

According to an important aspect of the invention, the detecting apparatus 1 includes a first and a second detecting device 41, 42, located on opposite sides of the advancement path and intended to scan the products 10 transported on the conveyor 2.

In detail, the invention preferably uses two measuring devices 41, 42 of profiles in the line, one facing another and mounted to the right and left of the conveyor 2, at a predetermined distance.

To be precise, as can be seen in FIGS. 1-5, the two detecting devices 41, 42 are located on opposite sides of the belt of the conveyor 2 and are preferably aligned to one another, as both are pointed towards the advancement path, i.e. towards the analysis zone Z continuously crossed by the products 10 to be scanned.

In still greater detail, the two detecting devices 41, 42 are located at opposite sides of the analysis zone Z, as defined in the foregoing; in practice, the two devices 41, 42 are arranged to the right and left of the belt 20 of the conveyor 2 and the upper floating belt 3.

Further, the two detecting devices 41, 42 or scanners are preferably fixed with respect to the support frame 101 of the apparatus 1, and thus remain stationary while the slices pass in front thereof, borne by the conveyor 2.

Each scanner 41, 42 is adapted to acquire in sequence a multiplicity of partial profiles, or "semi-profiles" of the product 10 detected, in accordance with a predetermined scanning frequency.

Each partial profile is preferably constituted by a continuous line.

In other words, the two opposite scanners each acquire a series of lateral profiles of the conveyed product 10, according to a cadence determined by a scanning frequency, which is preferably the same for each scanner 41, 42.

The partial profiles acquired by each detecting device 41, 42 are taken in a scanning plane which is preferably transversal to the movement direction of the products 10, i.e. in practice the advancement direction of the conveyor 2.

The scanning plane of the first and second scanner 41, 42 can coincide or be parallel to and shifted by a minimised amount on the basis of the desired scanned resolution.

In any case, the scanning plane or planes cross the scanning zone Z from side to side.

The two scanners 41, 42 can also be of known type, but not in combination with the other components of the apparatus 1, nor in the use modes of the invention.

Each detecting device 41, 42 preferably comprises at least one laser sensor, adapted to produce profile signals representative of the aforementioned partial profiles detected.

Each laser sensor can intermittently produce a "blade" of laser light 51, 52 which invests the product 10 detected, extending in the above-mentioned scanning plane, and is able to acquire the light reflected from the product 10 in such a way as to reconstruct the partial profiles mentioned in the foregoing.

Figure 6:
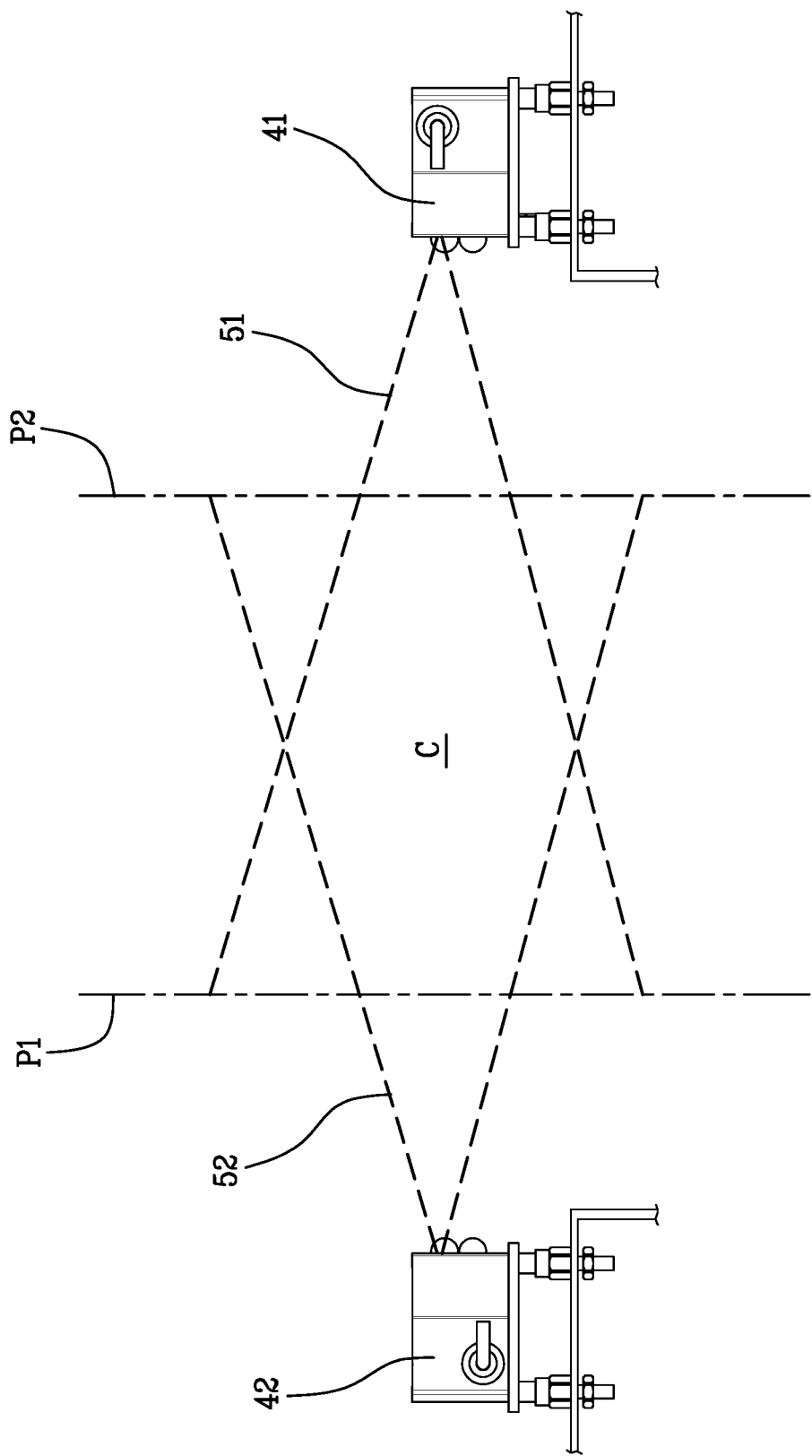
FIG. 6 is a schematic representation of the scanning modes of particular detecting devices mounted in the apparatus of the preceding figures.

As schematically illustrated in FIG. 6, the detections carried out by each laser sensor are delimited by a respective borderline plane (or line) P1, P2 of the detection, which represents the "zero" of the detection; in practice, for each sensor the non-null detections taken in the above-mentioned borderline plane P1, P2 are those acquired for objects or parts of an object (in this case, chicken breasts or other food products 10) which are comprised between the plane and the sensor.

An example of this type of sensors is the Keyence LJ-V7000, but the invention can obviously include the use of sensors of different marques and completely different types.

To be precise, the sensors can be positioned in such a way that the two borderline planes (or lines) P1, P2 can be parallel to one another but perpendicular to the conveyor plane and therefore to the belt 20 of the conveyor 2; for example, the borderline planes P1, P2 are arranged vertically.

As shown by way of example in FIG. 6, it can happen that the predefined detecting fields (identified by the respective semi-spaces) of the sensors superpose on one another, defining a detecting volume (or plane) C that is common to the two sensors; in the following an advantageous specification of the invention will be described which enables avoiding a "double detection" in the common volume C which would risk falsifying the analysis of the products 10.

The invention comprises a processing unit 6 connected to the first and to the second detecting device 41, 42 and, preferably, to the conveyor 2 and to the weight measuring device.

In practice, the processing unit 6 is adapted to receive profile signals from the detecting devices 41, 42, transport signals from an electromechanical actuator which activates the conveyor 2, for example a motor connected to one of the idler rollers or a motor roller or the like, and weight signals from the above-mentioned measuring device.

Further, the processing unit 6 can be configured to transmit movement signals adapted to determine or vary the transport velocity of the conveyor 2, in which case the cited electromechanical device is adapted to receive the movement signals and is configured to vary or maintain the velocity of the belt as a function of these signals.

Likewise, the floating belt 3 too is activated by a dedicated electromechanical device subjected to the processing unit 6, and activatable for example at the same velocity as the lower belt 20.

Further, the processing unit 6 can be configured to transmit sampling signals adapted to determine or vary the scanning frequency of the detecting devices 41, 42, in which case the detecting devices are adapted to receive the sampling signals and are configured to vary or maintain the scanning frequency as a function of these signals.

Note that the processing unit 6 can comprise or be connected to a user interface configured for enabling a user U to select or set detecting parameters.

The scanning parameters can represent the velocity with which to advance the products 10 by means of the conveyor 2, the requested scanning frequency or other management and control magnitudes of the apparatus 1.

The user interface can be provided with command and control means such as a touchscreen display 7, keyboards, levers, joysticks, buttons, code readers, connectors (such as USB ports) or more besides.

In general, it is to be noted that, in the present description, the processing unit 6 is presented subdivided into distinct functional modules for the sole purpose of describing the functions thereof in a clear and complete manner.

In practice, this processing unit 6 can be constituted by a single electronic device, appropriately programmed to perform the functions described; the different modules can correspond to hardware entities and/or software routines that are part of the programmed device.

Alternatively or additionally, these functions may be performed by a plurality of electronic devices on which the aforesaid functional modules can be distributed.

In general, the processing unit 6 can avail of one or more microprocessors for performing the instructions contained in the memory modules and the aforesaid functional modules may, also, be distributed over a plurality of local or remote calculators based on the architecture of the network in which they reside.

In an important aspect of the invention, the processing unit 6 comprises a first shape module 61 configured to determine the conformation of the external surface of a first portion of the product 10, based on the partial profiles acquired by the first detecting device 41, at the above-mentioned scanning frequency and at the advancement speed of the conveyor 2.

Further, the processing unit 6 comprises a second shape module 62 configured to determine the conformation of the external surface of a second portion of the product 10, based on the partial profiles acquired by the second detecting device, at the scanning frequency and at the advancement speed.

In practice, the product 10 advances, transported by the belt of the conveyor 2, and once superiorly engaged by the floating belt 3, it passes between two detecting devices 41, 42, displaying to the detecting devices 41, 42 a respective opposite side, which we can call the right side to the first device and the left side to the second device.

Therefore, as the product 10 gradually advances in front of two detecting devices 41, 42, the relative sensors progressively acquire the conformation of a multiplicity of linear profiles taken on the right side and the left side, at different points in the length of the product 10 (see FIGS. 1-5).

Knowing the scanning interval with which the profiles and the velocity at which the product moves 10 have been acquired, the two shape modules 61, 62 are adapted, for example by interpolation, to afford the shapes of the right and left sides of the product 10, i.e. the external surfaces of the respective portions of product 10.

The two portions involved in the acquiring of the two laser sensors and the processing of the respective shape modules 61, 62 are preferably complementary in the sense that together they define the external surface of the product 10 substantially in its entirety.

With the purpose of developing the calculations, the processing unit 6 comprises at least a memory unit 53, connected to the operating modules, in which the partial profiles acquired by the detecting devices 41, 42 and the shapes of the portions of the product 10 calculated thereby are recorded.

Further, the processing unit 6 can advantageously include a first volume module 64 configured to calculate the volume of the internal space defined by the surface of the first portion, as calculated by the first shape module 61.

In other words, the first volume module 64 determines the volume of the first portion of the product 10 or the second semi-product, which in practice corresponds to the right part of the product 10 in the example of the appended figures.

The processing unit 6 can comprise a second volume module 65 configured to calculate the volume of the internal space defined by the surface of the second portion, as calculated by the second shape module 62; thus, the second volume module 65 determines the volume of the second portion of the product 10 or the second semi-product, i.e. the left side of the product 10 in the illustrated example.

As indicated partially in the foregoing, the processing unit 6 is able to avoid risks of "double detection" due to the fact that it comprises at least one distribution module 66 configured to determine a separating plane O, parallel to the detecting planes, that defines two detecting semi-spaces that include respective detecting devices 41, 42 (see FIGS. 1-5).

The distribution module 66 is configured to filter the profile signals of the sensor of each device 41, 42 so as to ignore what pertains to the semi-space of the other device 41, 42.

In practice, the processing unit 6 makes available a plane O, a "virtual zero" common to both sensors, which defines the limits beyond which the profile signals of each sensor are held to be null, while a non-null value is given to the signals corresponding to the points detected in the respective detection semi-space.

Therefore, the partial profile described above is the portion of the profile detected by the sensor which has been filtered by the processing unit 6 and in practice it is the portion that is located in the detection semi-space of that sensor.

Taking account of this, the above-mentioned volume modules 64, 65 can be configured to carry out integration processing of the filtered signals, taking as zero the coordinates located on the separating plane O.

The processing unit 6 advantageously comprises at least one distinction module 67, configured to filter the profile signals of the sensor of each device 41, 42 so as to ignore the detections related to the lower belt 20 and the upper belt 3, defining partial profiles limited to the food product 10.

In practice, the values of the profile signals that correspond to points belonging to the belts 20, 3 are ignored or annulled by the distinction module 67 to define the semi-profiles mentioned in the foregoing.

In detail, experiments carried out by the Applicant have revealed that at the point or points of transition between the food product 10 and the belts 20, 3, the starting profile (i.e. not filtered) determined by the detecting devices 41, 42 has points of discontinuity (or singularity) in the mathematical context, such as cusps, leaps, etc.

Taking this into account, the distinction module 67 can be configured so as to calculate the value of the derivative in a plurality of points taken along the curve defined by each starting profile, identifying the points at which the value of the derivative tends to the infinite, thus calculating the said points of discontinuity.

In this case, the distinction module 67 filters the starting profile, eliminating the end sections which comprise the points of discontinuity.

Further, the Applicant has experimentally determined that the products 10 to be analysed sometimes have very reflective surface points; for example, it has been demonstrated that chicken breast 10 can comprise small traces of fat that are very reflective.

As there exists the possibility that these reflective points cause scanning errors, the invention is able to ignore and isolate the values of the signals produced by the detection of the laser sensors.

In fact, it has been experimentally verified that the signals corresponding to these hyper-reflective points have abnormal values, in practice defining peaks in the curves representing the non-filtered starting profiles, captured by the detecting devices 41, 42.

Therefore, the distinction module 67 can be configured to filter the signals in such a way as to ignore values above a maximum predetermined threshold.

The processing unit 6 advantageously comprises a combination module 68 configured to determine the total volume of each product 10 detected, according to said first and second volume.

Further, the processing unit 6 can comprise a density module 69 configured to determine the density of the products 10 based on the relative weight acquired by the measuring device and the relative volume.

In other words, the processing unit 6 is able to determine the density of each of the products 10 examined.

As partly described in the foregoing, the apparatus 1 of the invention is specially destined to be used in or with a slicer 100.

As the invention enables knowing, for each of the products 10 analysed, the density and conformation, it is advantageously possible to subdivide each food product 10 into a plurality of slices having a predetermined weight.

Note that the weight of the slices can be one of the command parameters selectable or settable via the above-mentioned user interface.

The processing unit 6 preferably comprises a partition module 71 configured to calculate, as a function of the density, volume and conformation of the external surface of each product 10, thicknesses of slices into which such product 10 is to be cut so that said slices have predetermined weights.

For example the processing unit 6 can be set up in such a way that it calculates what the thickness of the slices must be so that they have the same weight, or that a subset of all the slices has the same weight; differently, a specific weight might be set for each slice, which can coincide with or be different from the weight of the other slices, and so on.

In still greater detail, the apparatus 1 of the invention can be included in a detecting station of an industrial slicer 100.

In this case, a cutting station can be arranged downstream of the detecting station, comprising a plurality of blades 8 adapted for cutting the product 10 into slices and for example arranged horizontally, and a movement apparatus able to adjust mutual distances between the blades 8 so as to vary the thicknesses of the slices.

In practice, the movement apparatus is able to vary the cutting pitch of the blades 8, which are reciprocally mobile as they are flexible and/or translatable, so as to adjust their mutual distance.

The processing unit 6 can comprise a cutting module 72, configured to generate cutting signals adapted to determine (or vary) the distances between the blades 8 in accordance with the thicknesses of the slices calculated by said partition module 71.

Therefore, the movement apparatus is adapted to receive the cutting signals and establish, as a function thereof and for each product 10 detected, what the distances between the blades 8 must be, so that the thicknesses are the ones desired.

The partition module 71 can be configured to determine how to cut the detected product 10 into a plurality of slices substantially having the same weight or it can be configured to establish a subdivision into slices having thicknesses that are a function of the settings acquired from the user interface or on the basis of a cutting program recorded in the memory module and run by the processing unit 6.

In the following the preferential functioning of the apparatus 1 of the invention will be explained, using the case, by way of example, of an analysis of a chicken breast 10.

As illustrated in FIG. 1, the chicken breast 10 fed to the apparatus 1 is transported by the conveyor 2, resting on the relative belt, towards the detecting zone.

Meanwhile, it is weighed by the appropriate device which was described in the foregoing.

Having reached the detecting zone, the product 10 is taken between the two belts 10, 3, i.e. is pressed by the floating belt 3 while continuing to advance.

Figure 8:
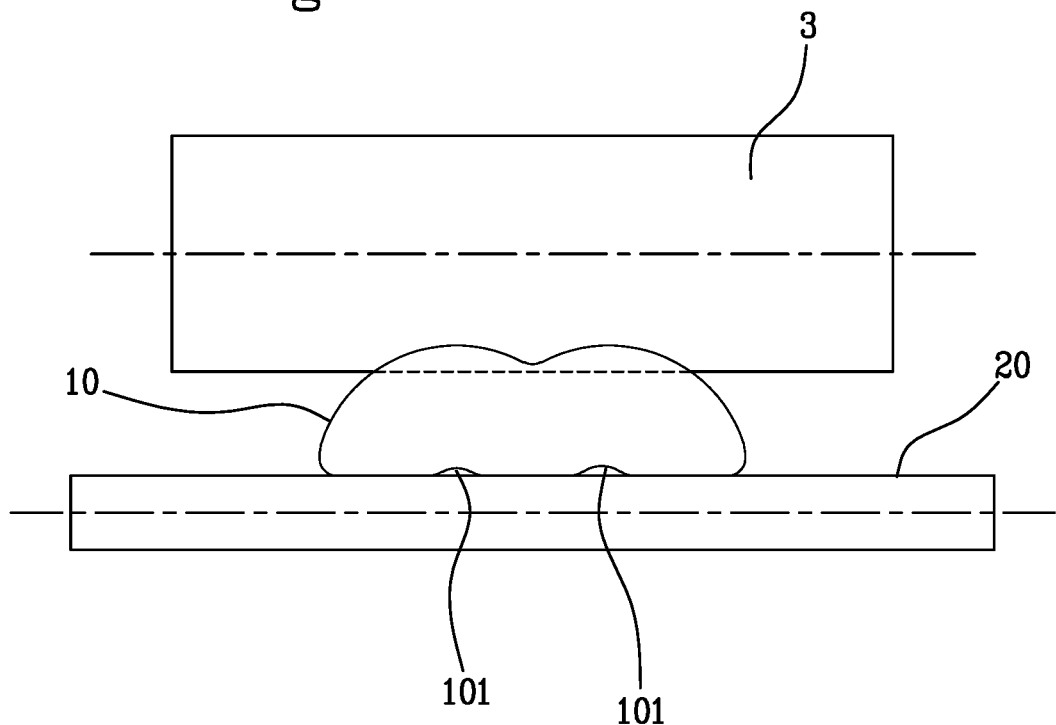
FIGS. 8 and 9 are stylised front views of two rollers comprised in the apparatus of the preceding figures, shown while they are engaging a food product in two different moments.
Figure 9:
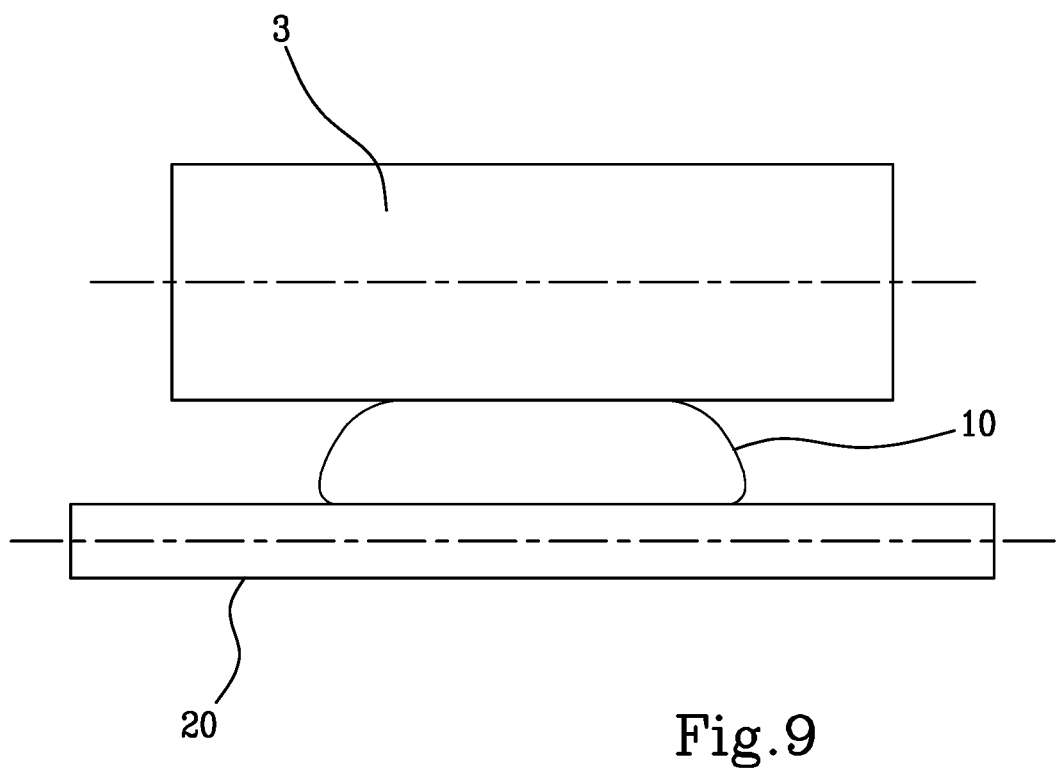

Note that, as schematically illustrated in FIGS. 8 and 9, the fact of having included the floating belt 3 advantageously enables making the measurements and calculations carried out by the devices and modules of the invention immune from the fact that the chicken breast 10 has or does not have small recesses or cavities 101, especially on the lower surface in contact with the belt 20 of the conveyor 2, to which reference is made in the discussion of the prior art.

In fact, the floating belt 3 exerts a pressure that, on a deformable food product 10 such as a chicken breast or the like, leads to the closure of any cavities 101, as shown in FIG. 9.

Note that the limited deformation necessary for the closing of the cavities 101 does not constitute a problem for the correct analysis of the product 10, as when the product is scanned it is engaged between the floating belt 3 and the lower conveyor belt, in the above-mentioned analysis zone.

Therefore, with the invention, there is no need to cool the product 10 before it is taken to the examining apparatus 1, thus enabling the quality thereof to be conserved.

Figure 4:
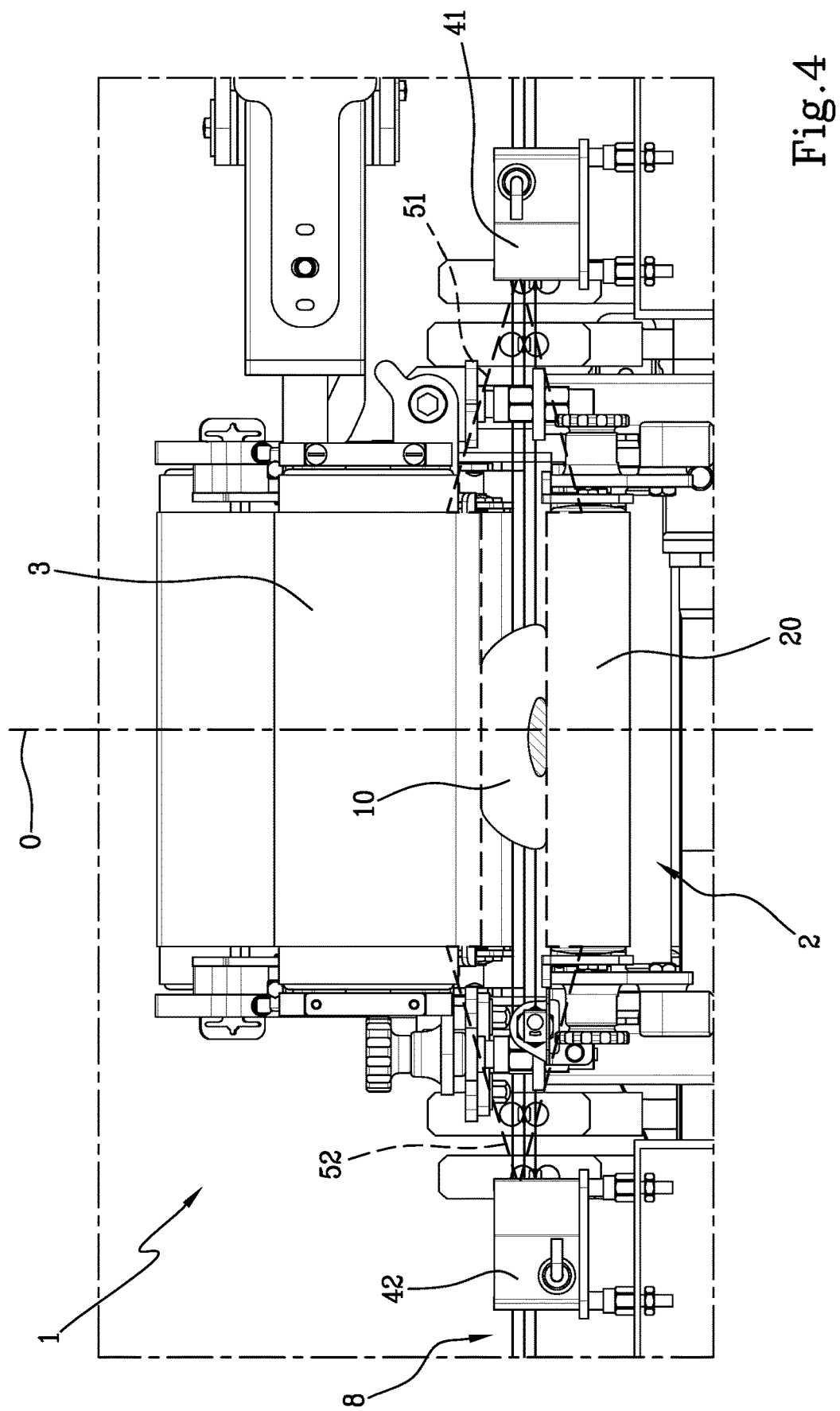
FIGS. 4 and 5 are rear views, partly in transversal section, of the preceding apparatus, in which an analysed product is schematically illustrated in two different moments.
Figure 5:
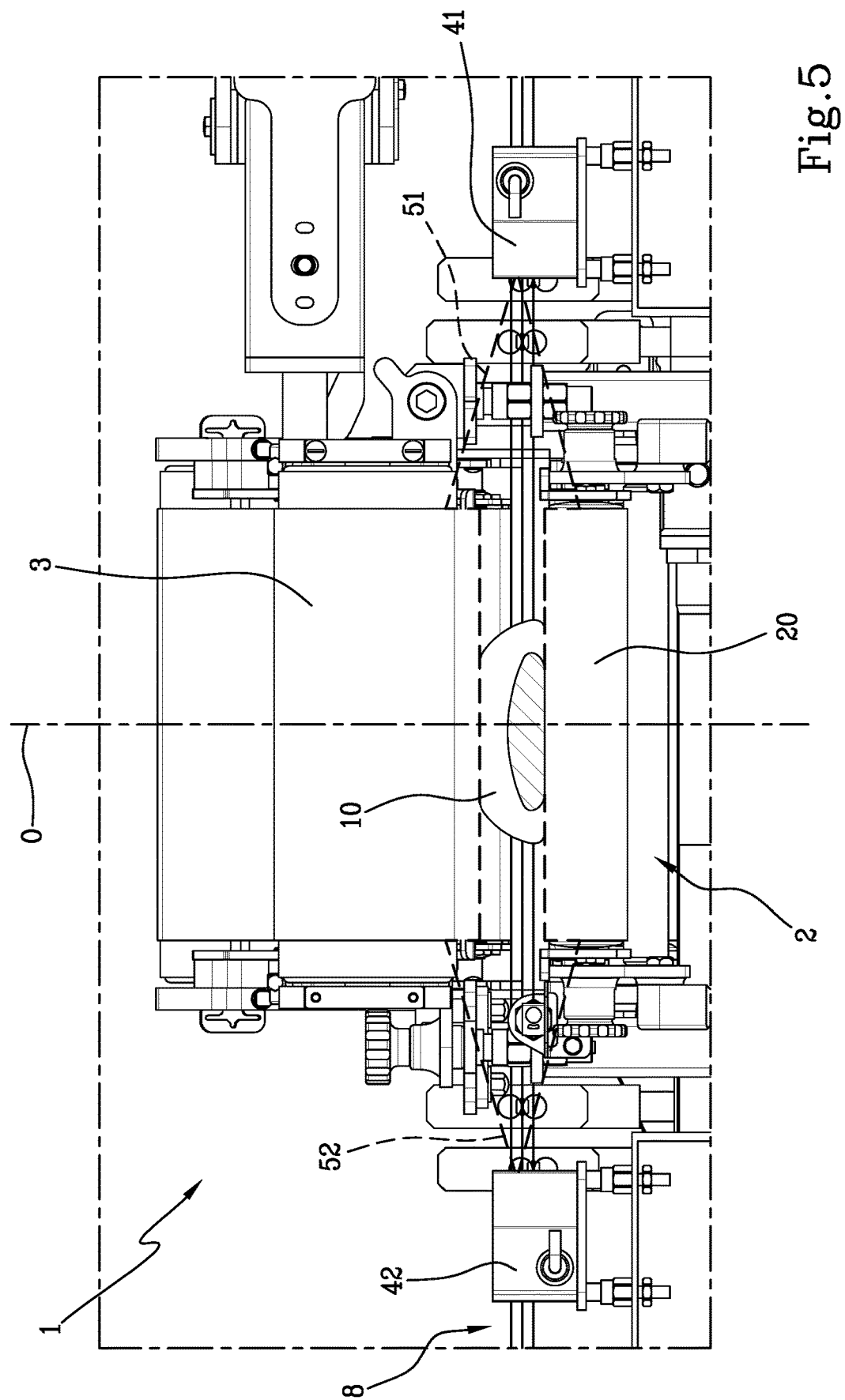

As can be seen in FIGS. 4 and 5, where the product 10 is represented in stylised form, as it is gradually advanced towards the outlet of the apparatus 1, the detecting devices 41, 42 scan, to the right and left, different transversal sections thereof (to be precise, transversal to the advancement direction) and acquire the shape and dimensions of the relative profiles, according to the above-described modes, which are represented in the appended tables by perimeter curves that surround the field in oblique lines.

Figure 7:
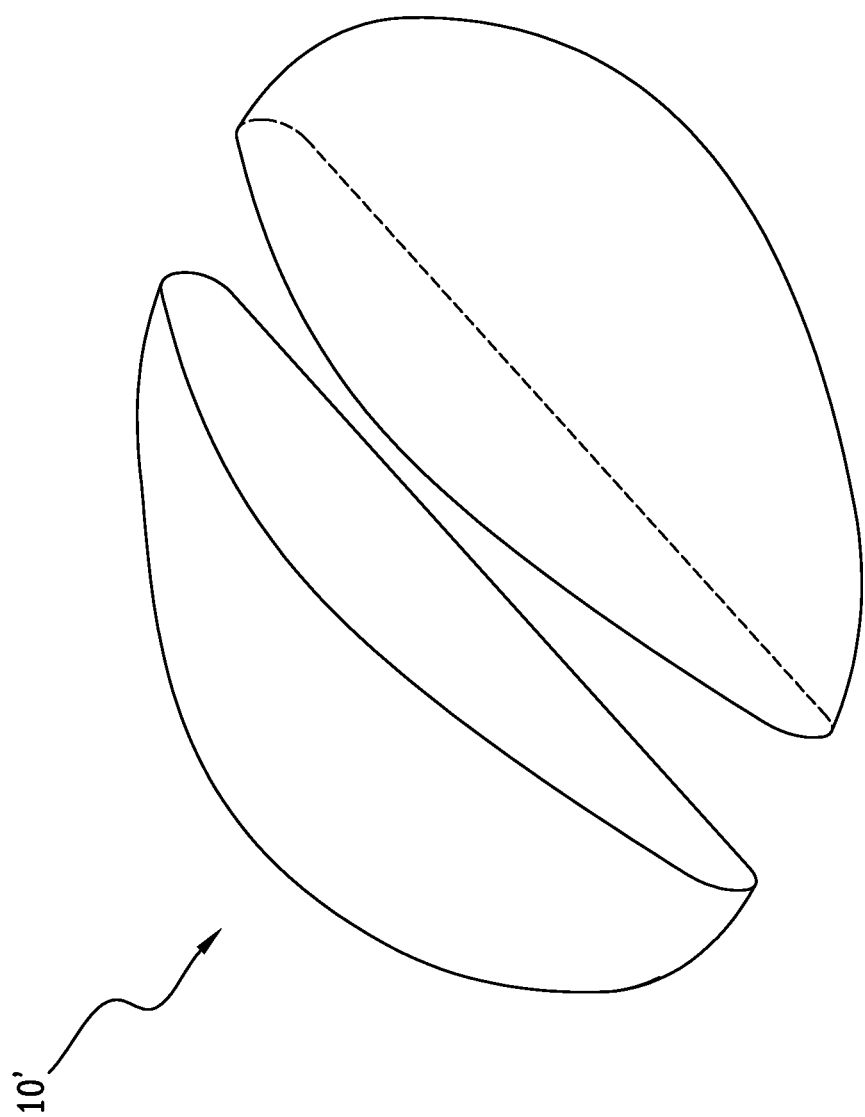
FIG. 7 is a stylised representation of the data acquired and in part processed by an electronic processing unit of the invention, relative to a scanned product, such as for example a chicken breast.

When the product 10 has completely crossed the "blades" of laser light 51, 52, the processing unit 6 has acquired the shape and dimensions of the semi-product on the right and left, as shown in FIG. 7 by means of the representation of a virtual product 10' subdivided into two parts; further, the processing unit 6 has also calculated the specific density of the chicken breast.

Figure 10:
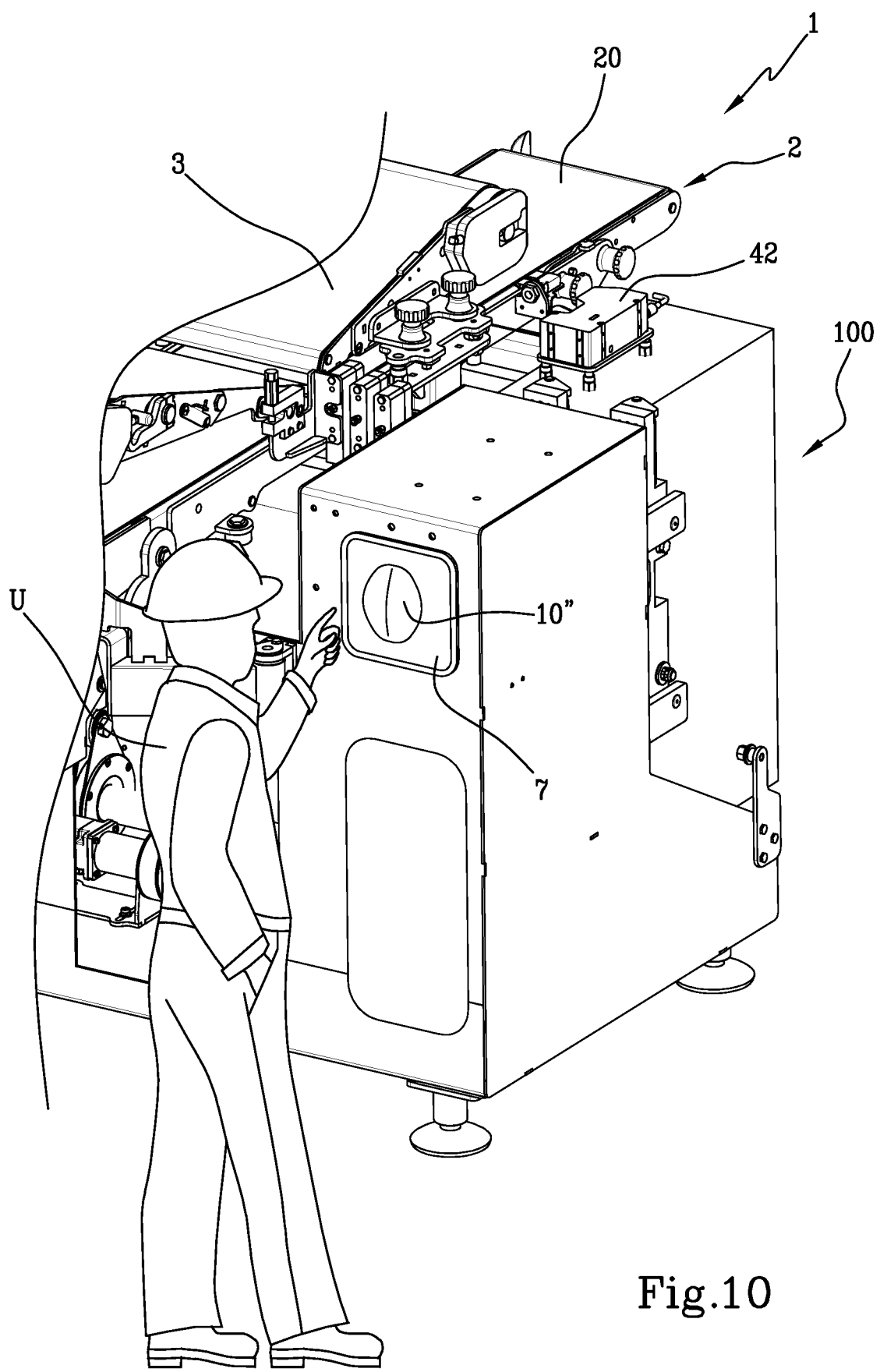
FIG. 10 is an axonometric view of a slicer machine which comprises the apparatus of the invention and a display that shows a product detected to an operator.
Figure 11:
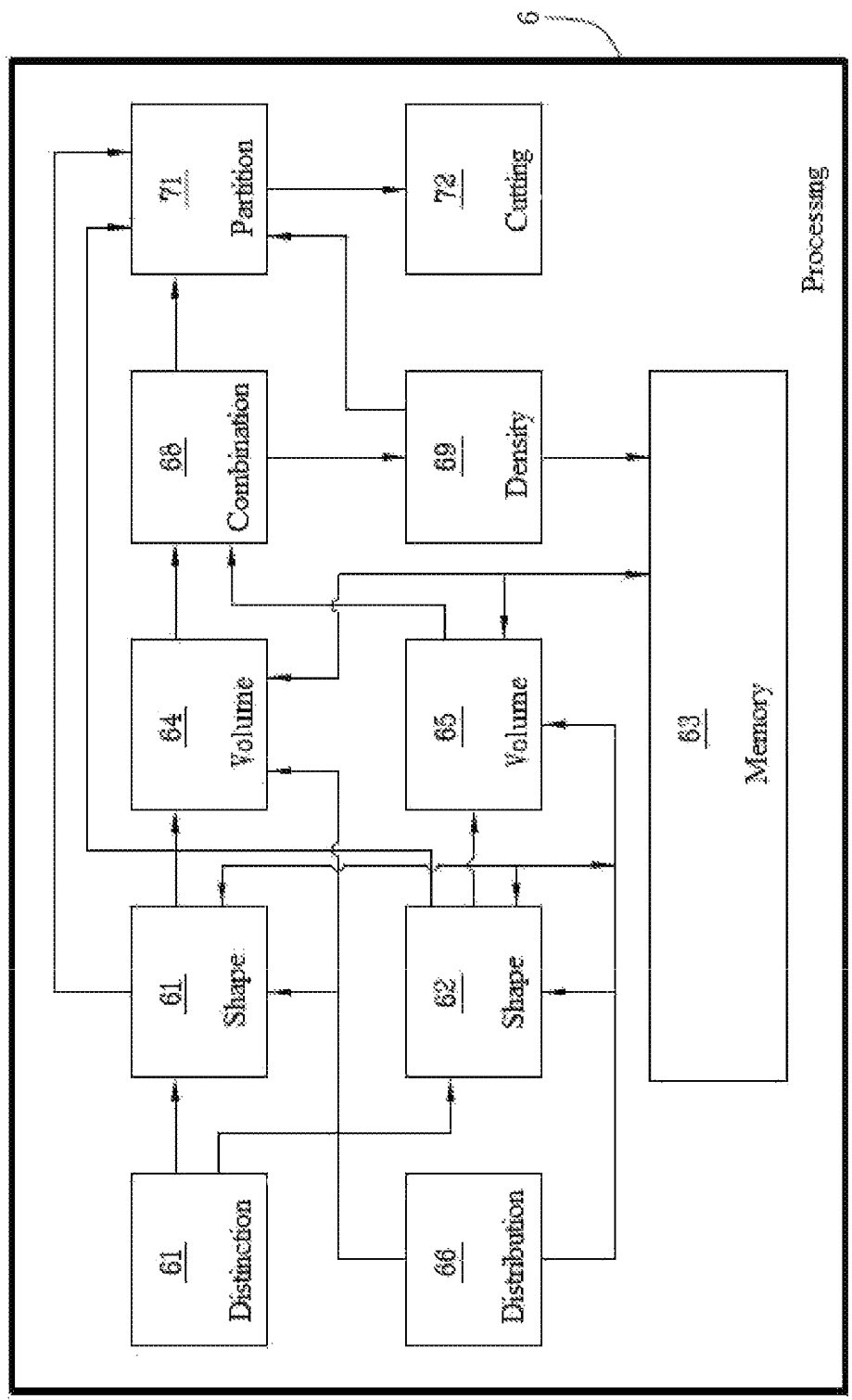
FIG. 11 is a diagram illustrating the processing unit according to the invention, represented in the operating and memory modules thereof.

Therefore, the processing unit 6 can show the user U the shape 10" of the whole product (therefore not subdivided into semi-portions), for example via a display 7 (see FIG. 10) which can also coincide with the display of the user interface as mentioned above.

In a case in which the apparatus 1 is integrated in or functionally associated to a slicer 100, the blades 8 of the cutting station are preferably located at the terminal end of the floating belt 3, so as to intercept the product 10 when the product 10 is still in the slightly deformed configuration as described in the foregoing.

Owing to the detections carried out by the analysis apparatus 1, the slicer 100 can subdivide the product 10, for example the chicken breast, into slices having a thickness that is the function of the needs of the user U.

The analysis operations, and possibly the cutting operations, are clearly repeated for each product 10 fed to the apparatus 1 and advanced by the conveyor 2.

The invention can include the use of position sensors to detect the relative position of the product 10 that is advancing on the conveyor 2 and the length of the product 10 so that the processing unit 6 can appropriately activate and deactivate the detecting devices 41, 42.

The invention also relates to a method for detecting physical characteristics of a food product 10, such as poultry, meat or fish, etc., which can be actuated using the apparatus 1 described in the foregoing.

The method comprises the following steps:
acquiring a multiplicity of partial profiles of a first semi-portion and of a second semi-portion, respectively right and left, of the food product 10 transported on a conveyor 2 and pressed by the floating belt 3, the profiles being taken in distinct points of the lengthwise extension of the product 10, separated by a predetermined scanning pitch;
determining the conformation of the external surface of the first semi-portion, preferably by means of laser scanning means, based on the relative partial profiles and based on the above-mentioned scanning pitch; and
determining the conformation of the second semi-portion, preferably using laser scanning means, based on the relative partial profiles and based on the scanning pitch.

In the preferential actuation thereof, the method includes the following steps, listed below:
calculating a first volume of an internal space defined by said external surface of the first semi-portion;
calculating a second volume of an internal space defined by the surface of the second semi-portion;
acquiring the weight of the product 10;
determining the total volume of the detected product 10, as a function of the first and second volume;
determining the density of the product 10 based on its weight and volume;
calculating, as a function of the density, volume and conformation of the external surface of the product 10, thicknesses of slices into which the product 10 is to be cut so that said slices have predetermined weights, preferably substantially the same weight.

The method can comprise further steps constituted by one or more of the actions carried out by modules of the processing unit or, in general, by the functions carried out by the proposed apparatus 1 of the invention.

In particular, the present method includes that firstly starting profiles are acquired describing a semi-portion of the product 10, the conveyor 2 and the floating belt 3.

Following this, the end sections of each starting profile relative to the conveyor 2 and to the floating belt 3 are eliminated, so as to afford the aforementioned partial profiles, which refer to the product 10.

The method of the invention can be actuated using a computer program run on an electronic processor, for example the processing unit 6 mentioned a number of times in the foregoing.

The invention claimed is:

1. An apparatus (1) for detecting physical characteristics of food products (10), said food products (10) comprising poultry, meat and fish, said detecting apparatus (1) comprising:
a conveyor (2) for transporting said products (10) along an advancement path, at an advancement speed;
a floating belt (3), located above said conveyor (2) so as to define an analysis zone (Z) comprised between said floating belt (3) and the conveyor (2);
at least a first and a second detecting device (41, 42), located laterally on opposite sides of said advancement path and located horizontally across from each other, each able to acquire a multiplicity of partial profiles of the products (10) brought by the conveyor (2) into said analysis zone (Z), in accordance with a scanning frequency, said partial profiles being taken in a scanning plane of the first and second detecting devices; and
a processing unit (6) connected to said first and second detecting device (41, 42) and in turn comprising:
a first shape module (61) configured to determine the conformation of the external surface of a first portion of the product (10), based on the partial profiles acquired by the first detecting device (41), at said scanning frequency and at said advancement speed; and
a second shape module (62) configured to determine the conformation of the external surface of a second portion of the product (10), based on the partial profiles acquired by the second detecting device (42), at said scanning frequency and at said advancement speed; wherein each said detecting device (41, 42) comprises at least one laser sensor, able to produce profile signals representative of the aforementioned partial profiles detected, and wherein the processing unit (6) comprises at least one distinction module (67) configured to filter the profile signals of the sensor of each said detecting device (41, 42) so as to ignore the detections related to the conveyor (2) and the floating belt (3), defining partial profiles limited to the food product (10).

2. The apparatus (1) according to claim 1, wherein said processing unit (6) comprises:
a first volume module (64) configured to calculate a first volume of an internal space defined by said surface of the first portion; and
a second volume module (65) configured to calculate a second volume of an internal space defined by said surface of the second portion.

3. The apparatus (1) according to claim 2, comprising a combination module (68) configured to determine the total volume of each product (10) detected, according to said first and second volume.

4. The apparatus (1) according to claim 2, comprising a device for measuring the weight of the products (10) transported along said path, wherein the processing unit (6) comprises a density module (69) configured to determine the density of the products (10) based on the relative weight acquired by said measuring device and the relative volume(s).

5. The apparatus (1) according to claim 4, wherein said processing unit (6) comprises a partition module (71) configured to calculate, as a function of the density, volume and conformation of the external surface of each product (10), thicknesses of slices into which such product (10) is to be cut so that said slices have predetermined weights.

6. The apparatus (1) according to claim 1, wherein each detecting device (41, 42) comprises at least one laser sensor, able to produce profile signals representative of the aforementioned partial profiles detected.

7. The apparatus (1) according to claim 6, wherein the laser sensor is able to detect profiles of products (10) or portions of products (10) comprised in a semi-space defined by a respective borderline plane (P1, P2) intersecting said scanning plane.

8. The apparatus (1) according to claim 7, wherein the processing unit (6) is adapted to receive said profile signals and comprises at least one distribution module (66) configured to determine a separating plane (0), parallel to the borderline planes, that defines two detecting semi-spaces that include respective detecting devices (41, 42), said distribution module (66) filtering the profile signals of the sensor of each device (41, 42) so as to ignore what pertains to the semi-space of the other device.

9. The apparatus (1) according to claim 1, wherein said conveyor (2) comprises a lower sliding conveyor belt (20) intended to support the products (10) and said floating belt (3) is movable and intended to press on the products (10) brought by the lower belt (20) into the analysis zone (Z), wherein the two detecting devices (41, 42) are located at the opposite sides of the analysis zone (Z).

10. The apparatus (1) according to claim 1, wherein the conveyor (2) is a conveyor belt which forms a continuous loop.

11. An industrial slicer (100) for slicing food products (10), said food products (10) comprising poultry, meat and fish, said industrial slicer (100) comprising:
    a detecting station comprising an apparatus (1) according to claim 5; and
    a cutting station, arranged downstream of the detecting station, comprising a plurality of blades (8) adapted for cutting the product (10) and a movement apparatus adapted to adjust mutual distances between the blades (8), so as to vary the thicknesses of said slices and adapted to receive cutting signals from the processing unit (6);
    a cutting module (72), included in the processing unit (6), and configured to generate cutting signals adapted to determine the distances between the blades (8) in accordance with the thicknesses of the slices calculated by said partition module (71).

12. The slicer (100) according to claim 11, wherein the partition module (71) is configured to determine how to cut the detected product (10) into a plurality of slices substantially having the same weight.

13. A method for detecting physical characteristics of a food product (10), said food product (10) comprising poultry, meat and fish, the method comprising the following steps:
    acquiring, via a first and a second detecting device (41, 42) located laterally on opposite sides of an advancement path and located horizontally across from each other, a multiplicity of partial profiles of a first semi-portion and of a second semi-portion of said food product (10) transported on a conveyor (2) along the advancement path and pressed by a floating belt (3), said profiles being taken in distinct points of an extension of the product (10), separated by a predetermined scanning pitch;
    determining the conformation of an external surface of said first semi-portion, based on the relative partial profiles and based on said scanning pitch; and
    determining the conformation of said second semi-portion, based on the relative partial profiles and based on the scanning pitch; wherein a processing unit (6) is connected to said first and second detecting devices (41, 42); and wherein each said detecting device (41, 42) comprises at least one laser sensor, able to produce profile signals representative of the aforementioned partial profiles detected, and wherein the processing unit (6) comprises at least one distinction module (67) configured to filter the profile signals of the sensor of each said detecting device (41, 42) so as to ignore the detections related to the conveyor (2) and the floating belt (3), defining partial profiles limited to the food product (10).

14. The method according to claim 13, comprising the following steps:
    calculating a first volume of an internal space defined by said external surface of the first semi-portion; and
    calculating a second volume of an internal space defined by said surface of the second semi-portion.

15. The method according to claim 14, comprising the following steps:
    acquiring the weight of the product (10);
    determining a total volume of the detected product (10), as a function of said first and second volume;
    determining a density of the product (10) based on the weight and volume.

16. The method according to claim 15, comprising the step of calculating, as a function of the density, volume and conformation of the external surface of the product (10), thicknesses of slices into which the product (10) is to be cut so that said slices have predetermined weights.

17. The method according to claim 16, wherein the thicknesses of the slices are determined to have substantially the same weight.

18. The method according to claim 13, wherein starting profiles are provided, based on a semi-portion of the product (10), the conveyor (2) and the floating belt (3); wherein end sections of each starting profile relative to the conveyor (2) and to the floating belt (3) are removed, so as to afford the aforementioned partial profiles.

19. A computer readable medium having stored thereon software instructions that, when executed by a computer, carry out the steps of the method according to claim 13.

* * * * *